US00RE37243E

(19) United States
(12) Reissued Patent
Molinaro et al.

(10) Patent Number: US RE37,243 E
(45) Date of Reissued Patent: Jun. 26, 2001

(54) NECK FINISH FOR A CONTAINER AND A MATCHING REGISTERING MULTIPLE THREAD PATTERN IN A FLEXIBLE CAP FOR ENGAGEMENT ON SAID NECK FINISH

(75) Inventors: Luca Molinaro; Robert E. Crisci; Harry E. Crisci, all of New Castle, PA (US)

(73) Assignee: Portola Packaging, Inc., San Jose, CA (US)

(21) Appl. No.: 08/621,207

(22) Filed: Mar. 22, 1996

Related U.S. Patent Documents

Reissue of:
(64) Patent No.: 5,480,045
Issued: Jan. 2, 1996
Appl. No.: 08/113,064
Filed: Aug. 30, 1993

U.S. Applications:

(63) Continuation-in-part of application No. 08/036,277, filed on Mar. 24, 1993, now Pat. No. 5,307,946.

(51) Int. Cl.[7] ..... A65D 39/00
(52) U.S. Cl. ..... 215/256; 215/318; 220/296
(58) Field of Search ..... 215/252, 256, 215/318, 254, 321; 220/296, 288, 293

(56) References Cited

U.S. PATENT DOCUMENTS 2,162,711 * 6/1939 Hamberger .
2,162,712 * 6/1939 Hamberger .
3,650,428 * 3/1972 Miller .
3,885,696 * 5/1975 Eberhardt .
3,980,195 * 9/1976 Filmore .
4,298,129 * 11/1981 Stull .
4,354,609 * 10/1982 Hidding .
4,402,415 * 9/1983 Hopley .
4,418,828 * 12/1983 Wilde et al. .
4,497,765 * 2/1985 Wilde et al. .
4,534,480 * 8/1985 Santostasi et al. .
4,561,553 * 12/1985 Crisci .
4,589,561 * 5/1986 Crisci .
4,660,053 * 4/1987 Concoran et al. .
5,213,224 * 5/1993 Luch .

FOREIGN PATENT DOCUMENTS

2114553 * 8/1983 (GB) .

* cited by examiner

*Primary Examiner*—Joseph M. Moy
(74) *Attorney, Agent, or Firm*—Flehr Hohbach Test Albritton & Herbert LLP

(57) ABSTRACT

A blow molded container has a cylindrical neck portion with novel seven circumferentially spaced continuous spiral thread configurations on its exterior to immediately receive and engage an improved tamper indicating flexible cap comprising a top with an annular depending wall on its peripheral edge and seven circumferentially spaced continuous spiral thread configurations on the inner surface of the annular depending wall. The novel constructions enable the tamper indicating flexible cap to immediately engage the lead-in ends of the seven circumferentially spaced thread patterns on the exterior of the neck of the container without the heretofore necessary rotation of the prior art caps in order to engage the single spiral thread configuration on the neck of the container.

19 Claims, 2 Drawing Sheets

NECK FINISH FOR A CONTAINER AND A MATCHING REGISTERING MULTIPLE THREAD PATTERN IN A FLEXIBLE CAP FOR ENGAGEMENT ON SAID NECK FINISH

Matter enclosed in heavy brackets [ ] appears in the original patent but forms no part of this reissue specification; matter printed in italics indicates the additions made by reissue.

This is a continuation-in-part of Ser. No. 08/036,277 filed Mar. 24, 1993, [now abandoned] *U.S. Pat. No. 5,307,946.*

BACKGROUND OF THE INVENTION

1. Technical Field

This invention relates to containers such as blow molded plastic jugs which are widely used in the dairy industry and others for the expendible packaging of dairy products and other liquids and tamper indicating caps for engagement thereon.

2. Description of the Prior Art

Prior neck finishes on containers of this type may be seen in U.S. Pat. Nos. 2,162,711 of June, 1939; 2,162,712 of June, 1939; 3,650,248 of March, 1972; 3,980,195 of September, 1976; 4,354,609 of October, 1982; 4,402,415 of September, 1983, 4,418,828 of December, 1984; 4,497,765 of February, 1985, 4,534,480 of August, 1985; and 4,561,553 of December, 1985.

In each of the above U.S. Patents there are individual neck spiral thread configurations which require a cap with a matching single spiral thread configuration for engagement thereon and have the common fault of requiring selective testing rotation of the cap on the threaded neck of the container before the single thread patterns engage.

Additionally, partial semi-annular thread patterns comprising ribs are disclosed in U.S. Pat. Nos. 4,589,461 of May, 1986 and 4,666,053 of May, 1987.

In the '561 patent, several short angular ribs are circumferentially spaced on the inner surface of the depending annular wall of a cap and in the '053 patent a pair of vertically spaced short annularly disposed ribs are disclosed on the neck finish of the container.

Additional segmented semi-annular thread patterns are disclosed in U.S. Pat. Nos. 3,885,696, 4,298,129 and 5,213,224.

In U.S. Patent '696, a closure for a container with a lid is disclosed in which a series of separate partial multiple thread patterns are formed on a neck finish. Each of the threads extend only a partial way on the neck finish arc limited to an effective two vertical threads.

In U.S. Patent '129, a child-proof snap on twist off safety cap and container is disclosed in which an annular barrier flange is positioned on the bottom edge of the cap which requires a quarter turn twist to disengage for removal of the cap.

In U.S. Patent '224, a snap on screw off cap and container neck is disclosed having non-vertical fastening configuration ratchet teeth and a number of lead-in thread configurations.

The present invention provides an improved novel neck finish for a container such as a blow molded plastic jug on which a multiple spiral thread pattern configuration of continuous spiral threads are engaged in vertical and circumferentially spaced relation to one another with a thin wall plastic cap that may be pushed onto the container, snapping over three threads of the multiple spiral thread pattern, the cap having a top and a depending annular wall with multiple annular spiral thread patterns circumferentially and vertically spaced formed on the inner surface of said depending wall of the improved cap. The combination of the improved cap and improved neck finish of the container results in a rapid and positive engagement of three of the multiple continuous thread patterns on the respective neck finish with those on the inner surface of the depending wall of the cap requiring a final partial turn of the cap after sealing the closure.

SUMMARY OF THE INVENTION

A novel neck finish on a container such as a blow molded plastic jug forms multiple spiral thread patterns as the neck finish, the thread patterns being circumferentially spaced with respect to beginning and end and presenting multiple lead-in thread configurations adjacent the top of the blow molded container and its neck finish such as seven lead-in points circumferentially spaced with respect to one another and each point comprising the upper lead-in end of a continuous spiral thread formed on the neck finish and terminating on the lowermost portion of the cylindrical portion of the blow molded jug or container. The matching cap has registering multiple thread patterns spaced vertically and horizontally so that as for example seven lead-in ends of seven spiral threads on the neck finish of the container will readily and quickly engage multiple circumferentially spaced areas between the ends of seven circumferentially spaced continuous spiral thread patterns extending from adjacent the inner surface of the top of the cap to spaced positions near the bottom of the depending annular wall of the cap. Substantially improved application of the caps to the neck finishes of the containers is achieved as well as very substantially increased liquid sealing engagement between the multiple spiral thread patterns on the container neck finish and on the inner surface of the depending wall of the improved cap.

DESCRIPTION OF THE PREFERRED EMBODIMENT

Figure 1:
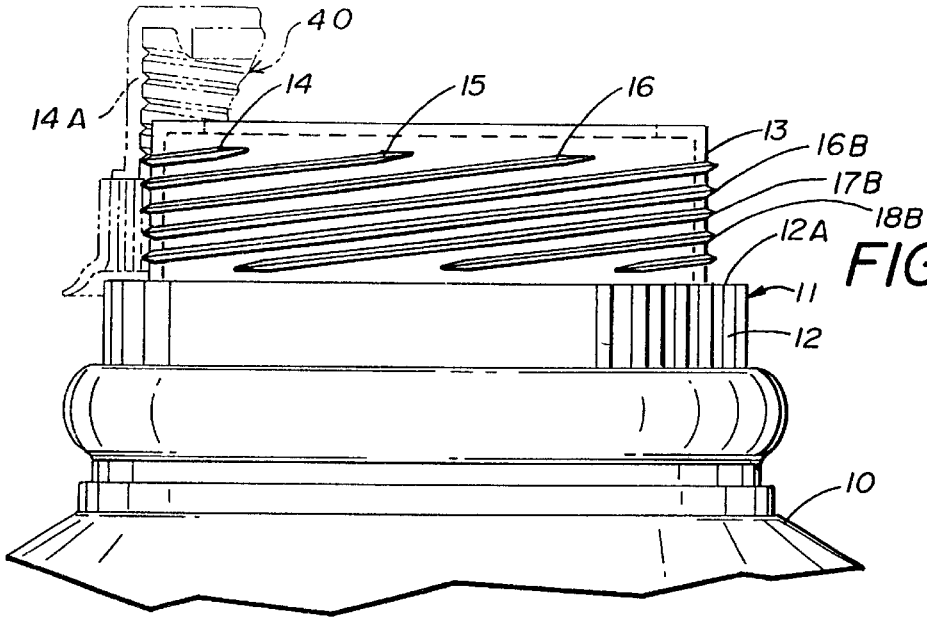
FIG. 1 is a side elevation of a portion of a container such as a blow molded jug with a cylindrical neck finish comprising the upper portion thereof and having the multiple horizontally and vertically spaced spiral thread configurations thereon.

By referring to the drawings and FIG. 1 in particular it will be seen that a portion of a blow molded jug or the like has a neck 11 of a first diameter including at least two groups of vertically fastening configurations 12 spaced circumferentially thereon which define a shoulder 12A. The neck of the container above the portion 12 is a cylindrical portion 13 with a plurality, preferably seven, of horizontally and vertically annular spaced threads 14, 15, and 16. As seen in FIG. 1 and by referring to FIG. 2 of the drawings the upper horizontally spaced ends of the remaining annular spiral threads are indicated by the numerals 17, 18, 19, and 20.

Figure 2:
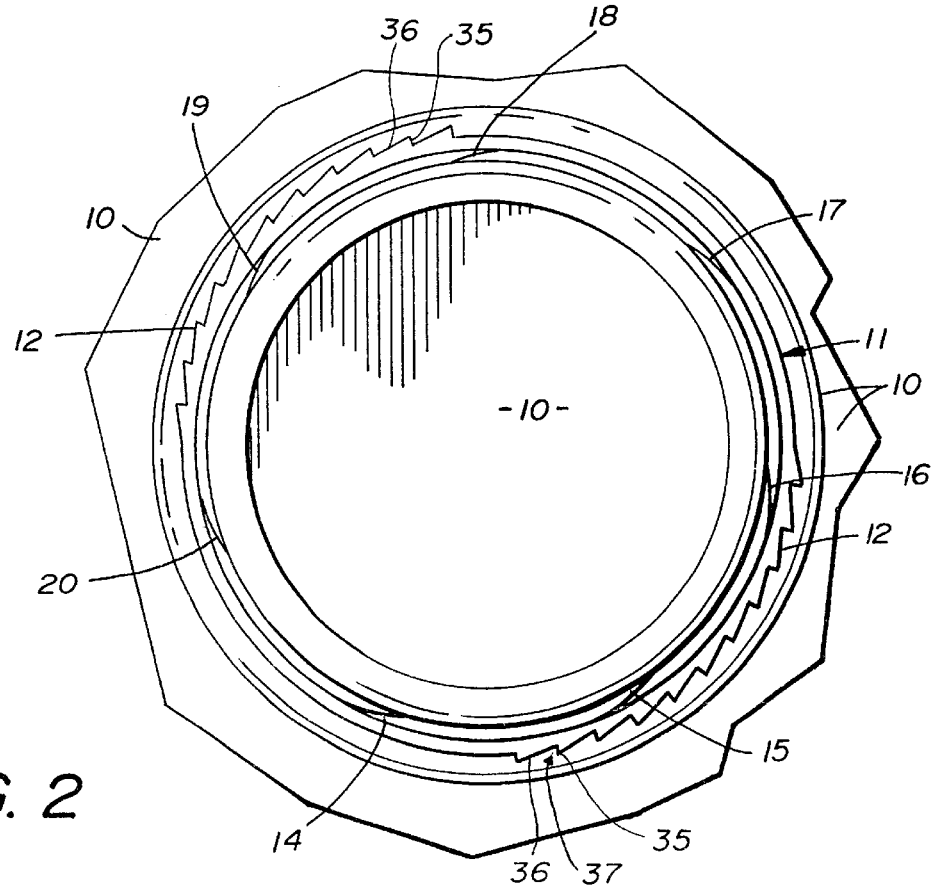
FIG. 2 is a top plan view of the blow molded container of FIG. 1 illustrated the preferred seven lead-in circumferentially spaced ends of the seven spiral threads comprising the neck finish.

Still referring to FIGS. 1 and 2 of the drawings, it will be seen that each of the vertically and horizontally spaced continuous annular spiral threads 14, 15, 16, 17, 18, 19, and 20 on the cylindrical neck portion in spaced relation to the upper surface of the portion 11 the neck finish. The annular spiral threads 14–20 define three snap thread portions 16B, 17B, and 18B therebetween.

By referring now to FIG. 2 of the drawings, it will be seen that the top plan view of the neck finish of FIG. 1 illustrates the lead-in ends of the seven circumferentially and vertically spaced annular spiral threads 14–20 respectively and wherein the lead-in ends as shown in FIG. 2 of the drawings are spaced circumferentially with respect to one another around the neck finish of the tubular portion of the neck 13.

Additionally, in FIG. 2, the vertical fastening configurations 12 may be seen to comprise two groups of ratchet teeth which are preferably positioned on the opposite sides of the neck portion 13 although the other groupings of the vertical fastening configurations 12 may be used if desired.

Figure 3:
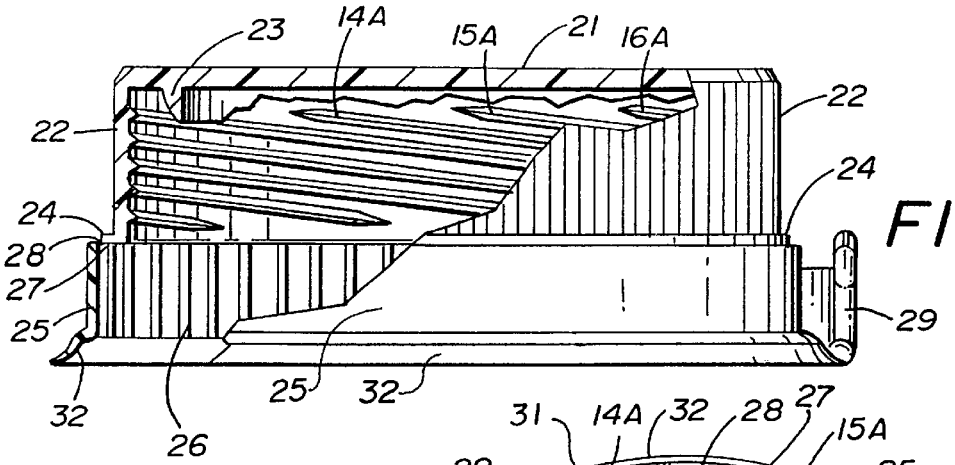
FIG. 3 is a side elevation with parts broken away illustrating an improved cap with vertically and horizontally spaced multiple raised thread patterns on the inner surface of the depending annular wall of the cap for matching engagement with the improved neck finish of FIGS. 1 and 2 of the drawings.
Figure 4:
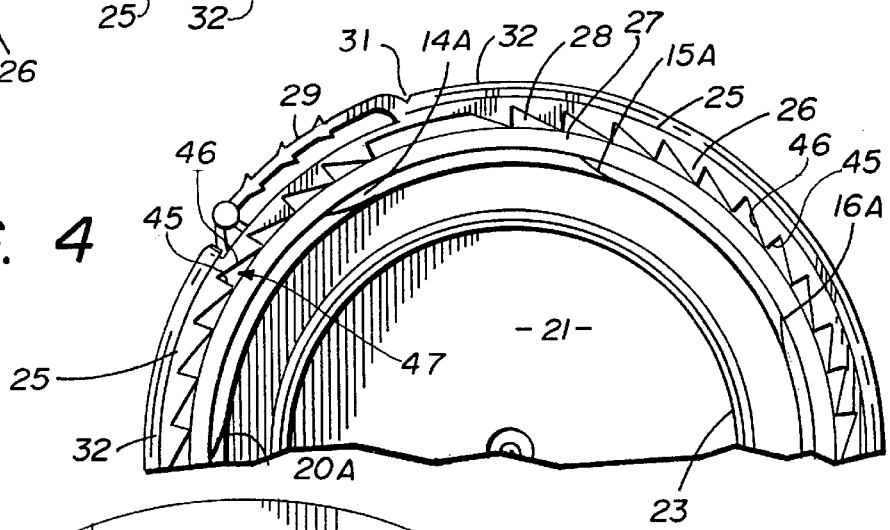
FIG. 4 is a partial bottom view of the improved thin wall plastic cap of FIG. 3 of the drawings.

By referring now to FIG. 3 of the drawings, multiple thread patterns 14A through 20A in the flexible cap register with the circumferentially and vertically spaced multiple spiral thread patterns hereinbefore described in connections with FIGS. 1 and 2. It will be seen that the cap comprises a top portion 21 having an annular depending wall 22 integrally joined to the peripheral edge of the top 21. The cap is provided with a downturned annular sealing flange 23 depending from the bottom of the top 21 of the cap and the bottom edge of the depending annular wall 22 comprises a narrow outturned rib 24. A tear skirt 25 of a slightly larger diameter than the rib 24 is formed with its inner surface having a continuous ratchet tooth configuration 26, the innermost upper corners of each of the ratchet teeth 26 comprise connecting members 27 by which the tear skirt 25 is integrally attached to the lower peripheral edge of the narrow outturned rib 24. It will be seen that the innermost upper corners of each of the ratchet teeth 26 which comprise the connecting members 27 are spaced circumferentially so as to leave a plurality of openings 28 that also appear in the left hand portion of the cap as seen in FIG. 5 of the drawings.

Referring to FIG. 1 of the drawings, a cap portion 40 can be seen in broken lines adjacent the neck 11 prior to registration with the respective thread patterns 14A on the flexible cap in initial contact with the respective snap thread portion 16B of the neck 11 as hereinbefore described.

It will be apparent that due to the nature of the multiple horizontally and vertically annular spiral spaced threads 14–20 positioned on the neck 11, that the effective initial registration point of the respective cap threads 14A–20A therewith will always be with the respective snap thread portions 16B–18B as the cap is pushed downwardly onto the neck 11 in the initial snapping (i.e. sealing of the cap with the neck). As the cap descends vertically onto the neck 11, the inter-engaging multiple thread portions provide for three distinct "snaps" of engagement illustrated by the snap thread portions 16B–18B. Once the "snaps" have been achieved, an effective closure seal is apparent between the annular sealing flange 23 and the neck 11.

Figure 5:
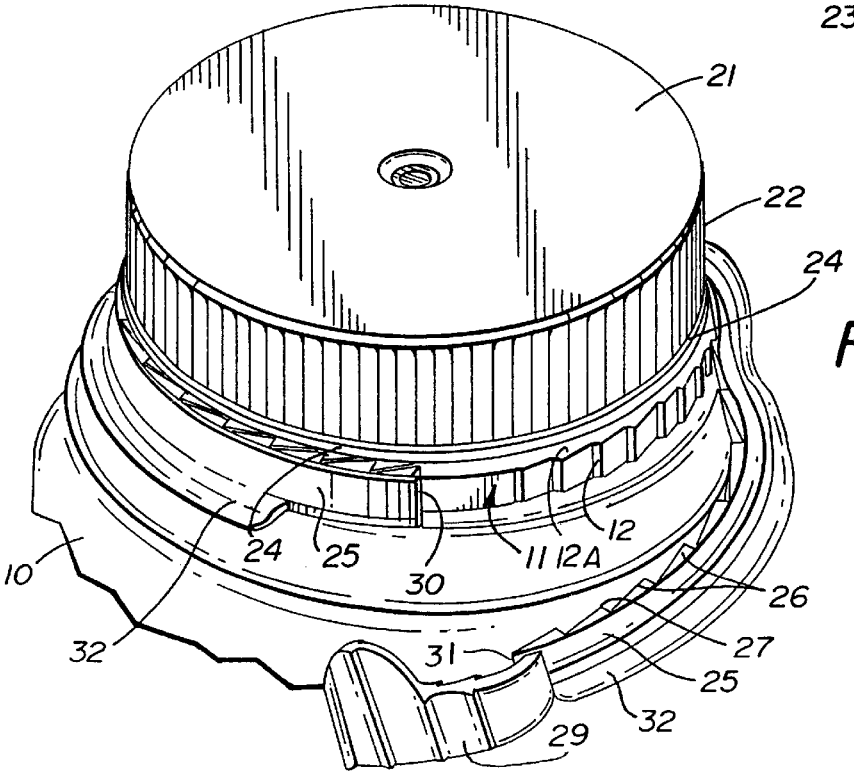
FIG. 5 is a perspective view of the cap of FIG. 3 and 4 of the drawings positioned on the upper portion of the container of FIG. 1 of the drawings with a portion of the combined tear skirt and flexible ratchet strip partially tom away therefrom.

Since the cap and neck 11 are not prepositioned before capping, the random position of the initial point of thread registration and "multiple snaps" of same, the cap once engaged while achieving a fluid seal with the neck 11, may not be fully threaded and would require ⅛th or more turn to achieve full thread engagement against the neck should 12A as seen in FIG. 5.

As illustrated in FIG. 5 of the drawings, the snap, twist on, twist off tamper indicating flexible cap is illustrated engaged on the neck finish of the cylindrical portion of the neck 13 of the container. The tear skirt 25 is illustrated partially separated from the annular depending wall 22 of the cap wherein the continuous ratchet teeth 26 are separated from their engagement with the lower peripheral edge of the narrow outturned rib 24 which defines the lower edge of the annular depending wall 22. The continuous ratchet teeth 26 of the flexible tear skirt 25 are shown partially disengaged from one of the two groups of ratchet teeth comprising the fastening configurations 12 on the neck 11 of the container 10. In order that the continuous ratchet strip comprising the tear skirt 25 be freed from the remainder of the cap as shown in FIG. 5, a pull tab 29 is freed from a vertical tear line 30 and moved outwardly as illustrated.

It will occur to those skilled in the art that by removing the tear skirt 25 completely, it is necessary to break away each of the connecting members 27 which are formed by the innermost upper comers of each of the ratchet teeth 26 which are closely circumferentially spaced with respect to one another and provide a very durable connection that is not subject to accidental tearing during the handling of the cap as in installing the same on the neck of a blow molded jug or the like.

By referring again to FIGS. 1 and 3, it will be seen that the tear skirt 25 which comprises the elongated ratchet strip with the ratchet teeth 26 is joined at one of its ends 31 to the tear tab 29 and its other end terminates in the vertical tear line 30. The tear skirt 25 in its as formed and in use position as best seen in FIG. 3 is positioned vertically and it will also be seen that its lower edge is provided with an outturned flange 32 which will engage and rest on the portion of the blow molded jug 10 immediately below the neck portion 11.

It will thus be seen that the snap twist on, twist off tamper indicating flexible cap for blow molded jugs or the like disclosed herein has several points of novelty by reason of the continuous ratchet teeth configurations formed by the ratchet teeth 26 on the inner surface of the tear skirt 25 of the cap and the attachment of the tear skirt 25 to the lower surface of the outturned narrow rib 24 which comprises the slightly widened lower edge of the annular depending wall 22 of the cap. This results in an unusual and novel large plurality of very small frangible connections between the upper innermost comers 27 of the ratchet teeth 26 of the continuous ratchet configuration of the inner side of the tear skirt 25.

Additionally, the plurality of horizontally and vertically spaced annular spiral threads defining three snap thread portions 16B–18B within to initial sealing engagement of the cap to the neck with the required selective turn of the cap after sealing to a full thread engagement if required.

It will thus be seen that a substantially changed and improved neck finish on a blow molded jug or the like in a flexible push on pull off or snap twist on, twist off cap have been illustrated and described and it will be apparent to those skilled in the art that various changes and modifications may be made therein without departing from the spirit of the invention and therefore

I claim:

1. In combination, a container neck and a closure therefor, said neck having an opening, a lip surrounding said opening, an upper neck stretch depending from said lip, [at least one] *a plurality of* first spiral thread [configuration] *configurations* on said upper neck stretch, a lower neck stretch below said upper neck stretch, said lower neck stretch having a plurality of exterior fastening configurations projecting therefrom, said closure having a top covering said opening, an upper skirt portion depending from said top, [at least one] *a plurality of* second spiral thread [configuration] *configurations* on said upper skirt portion mating with said [at least one] first spiral thread [configuration] *configurations* on said upper neck stretch *when said closure is substantially applied by pushing said closure onto said neck*, a removable lower skirt portion below said upper skirt portion, said lower skirt portion having a plurality of interior fastening configurations projecting therefrom,

*said first spiral thread configurations and said second spiral thread configurations being shaped to slip past each other and interengage as said closure is pushed onto said neck,* selected ones of said exterior fastening configurations and said interior fastening configurations interengaging to substantially resist relative rotation of said closure and said neck, each of said selected ones of said interior fastening configurations being positioned radially outwardly of a first one of said exterior fastening configurations and in engagement with a second one of said exterior fastening configurations to resist said relative rotation of said closure and said neck.

2. The combination of claim 1 in which said exterior fastening configurations have an exterior leading edge and an exterior slanted edge extending inwardly from said exterior leading edge toward said lower neck stretch, and in which said interior fastening configurations have an interior leading edge and an interior slanted edge extending outwardly from said interior leading edge toward said lower [skin] *skirt* portion, each of said selected ones of said interior fastening configurations being positioned with said interior slanted edge engaging said exterior slanted edge of said first one of said exterior fastening configurations and said interior leading edge engaging said exterior leading edge of said second one of said exterior fastening configurations.

3. The combination of claim 2 in which said exterior leading edge of one of said exterior fastening configurations is joined to said exterior slanted edge of an adjacent one of said exterior fastening configurations to define a recess shaped to axially receive one of said interior fastening configurations.

4. The combination of claim 2 in which said interior leading edge of one of said interior fastening configurations is joined to said interior slanted edge of an adjacent one of said interior fastening configurations to define a recess shaped to axially receive one of said exterior fastening configurations.

5. The combination of claim 1 in which said interior fastening configurations extend continuously around the circumference of said lower skirt portion.

6. The combination of claim 1 in which said interior fastening configurations have a tip joined to said upper skirt portion to frangibly connect said lower skirt portion to said upper skirt portion.

7. The combination of claim 1 in which said exterior fastening configurations and said interior fastening configurations are ratchet teeth.

8. The combination of claim 1 in which said closure includes a tear tab coupled to said lower skirt portion.

[9. The combination of claim 1 in which neck includes a plurality of first spiral thread configurations and said closure includes a plurality of second spiral thread configurations.]

10. The combination of claim [9] *1* in which said first spiral thread configurations define at least three first snap portions and said second spiral thread configurations define at least three second snap portions, said first snap portions and said second snap portions being shaped and positioned to slip past one another and interengage when said closure is applied to said neck.

11. The combination of claim [9] *1* in which said first spiral thread configurations have a lead-in end positioned adjacent said lip.

12. A container neck for use with a closure of the type having a top, an upper skirt portion depending from said top, [at least one] *a plurality of* first spiral thread [configuration] *configurations* on said upper skirt portion, a removable lower skirt portion below said upper skirt portion, said lower skirt portion having a plurality of interior fastening configurations projecting therefrom, said neck comprising:

an opening, a lip surrounding said opening, an upper neck stretch depending from said lip, [at least one] *a plurality of* second spiral thread [configuration] *configurations* on said upper neck stretch shaped and positioned to slip past said [at least one] first spiral thread [configuration] *configurations* and interengage when said closure is *substantially* applied [to] *by pushing said closure onto* said neck, a lower neck stretch below said upper neck stretch, said lower neck stretch having a plurality of exterior fastening configurations projecting therefrom, said exterior fastening configurations being shaped and positioned to engage said interior fastening configurations when said closure is applied to said neck to substantially resist relative rotation of said closure and said neck, said exterior fastening configurations having a leading edge and a slanted edge extending inwardly from said leading edge toward said lower neck stretch, said slanted edge of one of said exterior fastening configurations being joined to said leading edge of an adjacent one of said exterior fastening configurations to define a recess shaped to axially receive one of said interior fastening configurations when said closure is [applied to] *pushed onto* said neck with said one of said interior fastening configurations being positioned radially outwardly of said one of said exterior fastening configurations and in engagement with said leading edge of said adjacent one of said exterior fastening configurations to substantially restrain said relative rotation of said closure and said neck.

13. The container of claim 12 in which said exterior fastening configurations are ratchet teeth.

14. The container of claim 12 in which [said closure includes a plurality of first spiral thread configurations and said neck includes a plurality of second spiral thread configurations,] said first spiral thread configurations [defining] *define* at least three first snap portions and said second spiral thread configurations [defining] *define* at least three second snap portions, said second snap portions being shaped and positioned to slip past said first snap portions and interengage when said closure is [applied to] *pushed onto* said neck.

15. The container of claim 14 in which said second spiral thread configurations have a lead-in end positioned adjacent said lip.

16. A closure for use with a neck of the type having an opening, a lip surrounding said opening, an upper neck stretch depending from said lip, [at least one] *a plurality of* first spiral thread [configuration] *configurations* on said upper neck stretch, a lower neck stretch below said upper neck stretch, said lower neck stretch having a plurality of exterior fastening configurations projecting therefrom, said closure comprising:

a top, an upper skirt portion depending from said top, [at least one] *a plurality of* second spiral thread [configuration] *configurations* on said upper skirt portion shaped and positioned to slip past said [at least one] first spiral thread [configuration] *configurations* and interengage when said closure is *substantially* applied [to] *by pushing said closure onto* said neck, a removable lower skirt portion below said upper skirt portion, said lower skirt portion having a plurality of interior fastening configurations projecting therefrom, said interior fastening configurations being shaped and positioned to engage said exterior fastening configurations when said closure is applied to said neck to substantially resist relative rotation of said closure and said neck, said interior fastening configurations having a leading edge and a slanted edge extending outwardly from said leading edge toward said lower skirt portion, said slanted edge of one of said interior fastening configurations being joined to said leading edge of an adjacent one of said interior fastening configurations to define a recess shaped to axially receive one of said exterior fastening configurations when said closure is [applied to] *pushed onto* said neck with said one of said exterior fastening configurations being positioned radially inwardly of said one of said interior fastening configurations and in engagement with said leading edge of said adjacent one of said interior fastening configurations to substantially restrain said relative rotation of said closure and said neck.

17. The closure of claim 16 in which said interior fastening configurations extend continuously around the circumference of said lower skirt portion.

18. The closure of claim 16 in which said interior fastening configurations have a tip joined to said upper skirt portion to frangibly connect said lower skirt portion to said upper skirt portion.

19. The closure of claim 16 in which said interior fastening configurations are ratchet teeth.

20. The closure of claim 16 in which [said neck includes a plurality of said first spiral thread configurations and said closure includes a plurality of said second spiral thread configurations,] said fast spiral thread configurations [defining] *define* at least three first snap portions and said second spiral thread configurations [defining] *define* at least three second snap portions, said second snap portions being shaped and positioned to slip past said first snap portions and interengage when said closure is [applied to] *pushed onto* said neck.

* * * * *